US009865042B2

(12) United States Patent
Dai et al.

(10) Patent No.: US 9,865,042 B2
(45) Date of Patent: Jan. 9, 2018

(54) IMAGE SEMANTIC SEGMENTATION

(71) Applicant: Microsoft Technology Licensing, LLC, Redmond, WA (US)

(72) Inventors: Jifeng Dai, Beijing (CN); Kaiming He, Beijing (CN); Jian Sun, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/801,839

(22) Filed: Jul. 17, 2015

(65) Prior Publication Data

US 2016/0358337 A1    Dec. 8, 2016

(30) Foreign Application Priority Data

Jun. 8, 2015  (CN) ................. PCT/CN2015/080975

(51) Int. Cl.
*G06K 9/46*    (2006.01)
*G06T 5/10*    (2006.01)
*G06T 7/11*    (2017.01)

(52) U.S. Cl.
CPC .............. *G06T 5/10* (2013.01); *G06T 7/11* (2017.01); *G06T 2207/20081* (2013.01); *G06T 2207/20084* (2013.01)

(58) Field of Classification Search
CPC ............... G06T 7/0028; G06T 7/0081; G06T 2207/20024; G06K 9/00503; G06K 9/4676; G06K 9/4671
See application file for complete search history.

(56) References Cited

U.S. PATENT DOCUMENTS

| 5,647,027 | A  | 7/1997 | Burges et al. |
| 6,937,761 | B2 | 8/2005 | Thomas et al. |
| 7,317,830 | B1 | 1/2008 | Gordon et al. |
| 7,912,288 | B2 | 3/2011 | Winn et al. |

(Continued)

FOREIGN PATENT DOCUMENTS

| CN | 101299268 A   | 11/2008 |
| WO | 2014205231 A1 | 12/2014 |

OTHER PUBLICATIONS

Long et al.; "Fully convolutional networks for semantic segmentation"; IEEE Conference on Computer Vision and Pattern Recognition (CVPR), Jun. 2015. pp. 3431-3440.*

(Continued)

*Primary Examiner* — Eueng-Nan Yeh
(74) *Attorney, Agent, or Firm* — Davin Chin; Chin IP, PLLC

(57) ABSTRACT

In implementations of the subject matter described herein, the feature maps are obtained by convoluting an input image using a plurality of layers of convolution filters. The feature maps record semantic information for respective regions on the image and only need to be computed once. Segment features of the image are extracted from the convolutional feature maps. Particularly, the binary masks may be obtained from a set of candidate segments of the image. The binary masks are used to mask the feature maps instead of the raw image. The masked feature maps define the segment features. The semantic segmentation of the image is done by determining a semantic category for each pixel in the image at least in part based on the resulting segment features.

20 Claims, 4 Drawing Sheets

(56) References Cited

U.S. PATENT DOCUMENTS

| | | | |
|---|---|---|---|
| 8,374,979 | B2 | 2/2013 | Zhou et al. |
| 8,873,867 | B1 | 10/2014 | Alldrin et al. |
| 2008/0267471 | A1* | 10/2008 | Yu .................. G06K 9/4604 382/128 |
| 2009/0060277 | A1* | 3/2009 | Zhang ............... G06K 9/00711 382/103 |
| 2011/0305397 | A1 | 12/2011 | Piramuthu et al. |
| 2012/0269436 | A1 | 10/2012 | Mensink et al. |
| 2013/0343641 | A1 | 12/2013 | Mnih et al. |
| 2015/0110381 | A1 | 4/2015 | Parvin et al. |
| 2016/0055237 | A1* | 2/2016 | Tuzel ............... G06F 17/30707 382/224 |

OTHER PUBLICATIONS

"International Search Report & Written Opinion Issued in PCT Application No. PCT/CN2015/080975", Mailed Date: Feb. 2, 2016, 11 Pages.

Sun, et al., "Relating Things and Stuff via Object Property Interactions", In IEEE Transactions on Pattern Analysis and Machine Intelligence, vol. 36, Issue 7, Jul. 2014, pp. 1370-1383.

Gould, et al., "Region-based Segmentation and Object Detection", IIn Proceedings of Advances in Neural Information Processing Systems, Dec. 7, 2009, 9 pages.

Long, et al., "Fully Convolutional Networks for Semantic Segmentation", In Proceedings of CORR, Feb. 5, 2015, 10 pages.

Pathak, et al., "Fully Convolutional Multi-Class Multiple Instance Learning", In Proceedings of CORR, Feb. 5, 2015, 4 pages.

Cheng, et al., "ImageSpirit: Verbal Guided Image Parsing", In Proceedings of ACM Transactions on Graphics, vol. 34, Issue. 1, Nov. 2014, 10 pages.

Cadena, et al., "Semantic Segmentation of Urban Environments into Object and Background Categories", In Technical Report, Jun. 2013, 10 pages.

Arbelaez, et al., "Multiscale Combinatorial Grouping", In Proceedings of IEEE Conference on Computer Vision and Pattern Recognition, Jun. 24, 2014, 8 pages.

Brox, et al., "Object Segmentation by Alignment of Poselet Activations to Image Contours", In Proceedings of IEEE Computer Vision and Pattern Recognition, Jun. 21, 2011, 8 pages.

Bychkovsky, et al., "Learning Photographic Global Tonal Adjustment with a Database of Input/ Output Image Pairs", In Proceedings of IEEE Computer Vision and Pattern Recognition, Jun. 21, 2011, 8 pages.

Carreira, et al., "Semantic Segmentation with Second-Order Pooling", In Proceedings of 12th European Conference on Computer Vision, Oct. 7, 2012, 14 pages.

Deng, et al., "ImageNet: A Large-Scale Hierarchical Image Database", In IEEE Conference on Computer Vision and Pattern Recognition, Jun. 20, 2009, pp. 248-255.

Donahue, et al., "DeCAF: A Deep Convolutional Activation Feature for Generic Visual Recognition", In Proceedings of CORR, Feb. 13, 2015, 10 pages.

Everingham, et al., "The Pascal Visual Object Classes (VOC) Challenge", In International Journal of Computer Vision, vol. 88, Issue 2, Jun. 2010, 34 pages.

Girshick, et al., "Rich Feature Hierarchies for Accurate Object Detection and Semantic Segmentation", In Proceedings of CORR, Feb. 13, 2015, 21 pages.

Hariharan, et al., "Semantic Contours from Inverse Detectors", In IEEE International Conference on Computer Vision, Nov. 6, 2011, pp. 991-998.

Hariharan, et al., "Simultaneous Detection and Segmentation", In Proceedings of 13th European Conference on Computer Vision, Sep. 6, 2014, 16 pages.

He, et al., "Spatial Pyramid Pooling in Deep Convolutional Networks for Visual Recognition", In Proceedings of 13th European Conference on Computer Vision, Sep. 6, 2014, 14 pages.

Jia, et al., "Caffe: Convolutional Architecture for Fast Feature Embedding", In Proceedings of the ACM International Conference on Multimedia, Nov. 3, 2014, pp. 675-678.

Krizhevsky, et al., "ImageNet Classification with Deep Convolutional Neural Networks", In Proceedings of Advances in Neural Information Processing Systems, Dec. 2012, 9 pages.

Kumar, et al., "Obj Cut", In IEEE Computer Society Conference on Computer Vision and Pattern Recognition, vol. 1, Jun. 20, 2005, 8 pages.

LeCun, et al., "Backpropagation Applied to Handwritten Zip Code Recognition", In Journal Neural Computation, vol. 1, Issue 4, Dec. 1989, 11 pages.

Mallat, et al., "Matching Pursuits with Time-Frequency Dictionaries", In IEEE Transactions on Signal Processing, vol. 41, Issue 12, Dec. 12, pp. 3397-3415.

Mottaghi, et al., "The Role of Context for Object Detection and Semantic Segmentation in the Wild", In IEEE Conference on Computer Vision and Pattern Recognition, Jun. 23, 2014, pp. 891-898.

Shotton, et al., "TextonBoost: Joint Appearance, Shape and Context Modeling for Multi-class Object Recognition and Segmentation", In Proceedings of 9th European Conference on Computer Vision, May 7, 2006, 14 pages.

Simonyan, et al., "Very Deep Convolutional Networks for Large-Scale Image Recognition", In Proceedings of CORR, Sep. 2014, 13 pages.

Tighe, et al., "Superparsing: Scalable Nonparametric Image Parsing with Superpixels", In Proceedings of the 11th European Conference on Computer Vision, Sep. 5, 2010, 14 pages.

Uijlings, et al., "Selective Search for Object Recognition", In Proceedings of International Journal of Computer Vision, vol. 104, Issue 2, Sep. 2013, 14 pages.

Wu, et al., "Learning Active Basis Model for Object Detection and Recognition", In Proceedings of International Journal of Computer Vision, vol. 90, Issue 2, Nov. 2010, 56 pages.

Yang, et al., "Layered Object Detection for Multi-Class Segmentation", In IEEE Conference on Computer Vision and Pattern Recognition, Jun. 2010, 13, pp. 3113-3120.

Zeiler, et al., "Visualizing and Understanding Convolutional Networks", In Proceedings of CORR, Nov. 2013, 11 pages.

Dai, et al., "Convolutional Feature Masking for Joint Object and Stuff Segmentation", In Proceedings of CORR, Dec. 2014, 10 pages.

* cited by examiner

IMAGE SEMANTIC SEGMENTATION

RELATED APPLICATIONS

This application claims priority to International Application No. PCT/CN2015/080975, filed on Jun. 8, 2015, and entitled "IMAGE SEMANTIC SEGMENTATION." This application claims the benefit of the above-identified application, and the disclosure of the above-identified application is hereby incorporated by reference in its entirety as if set forth herein in full.

BACKGROUND

An image may contain multiple things, including objects and stuff. As used herein, the term "objects" refer to the things that have consistent shape and each instance is countable. Examples of the objects include, but are not limited to, people, animals, cars, and the like. The term "stuff" refers to the things that have consistent color or textures and arbitrary shapes. Examples of the stuff include, but are not limited to, grass, sky, water, and the like. The imaging process usually composites the appearances of these things. Image semantic segmentation aims to recover the image regions corresponding directly to things in an image by labeling each pixel in the image to a semantic category. Contrary to the object recognition which merely detects the objects in the image, the semantic segmentation assigns a category label to each pixel to indicate an object or a stuff to which the pixel belongs.

Convolutional neural networks (CNNs) can be used in image semantic segmentation. For example, two types of CNN features can be extracted. The region features are extracted from proposal bounding boxes, and the segment features are extracted from the raw image content masked by the segments. The concatenation of those two types of features is used to train classifiers.

SUMMARY

In accordance with implementations of the subject matter described herein, a new approach for image semantic segmentation is proposed.

The feature maps are obtained by convoluting an input image using a plurality of layers of convolution filters. The feature maps record semantic information for respective regions on the image and only need to be computed once. Segment features of the image are extracted from the convolutional feature maps. To this end, the binary masks are obtained from a set of candidate segments of the image. The binary masks are used to mask the feature maps instead of the raw image. The masked feature maps define the segment features. The semantic segmentation of the image is done by determining a semantic category for each pixel in the image at least in part based on the resulting segment features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," "third" and the like may refer to different or same objects. Other definitions, explicit and implicit, may be included below.

Figure 1:
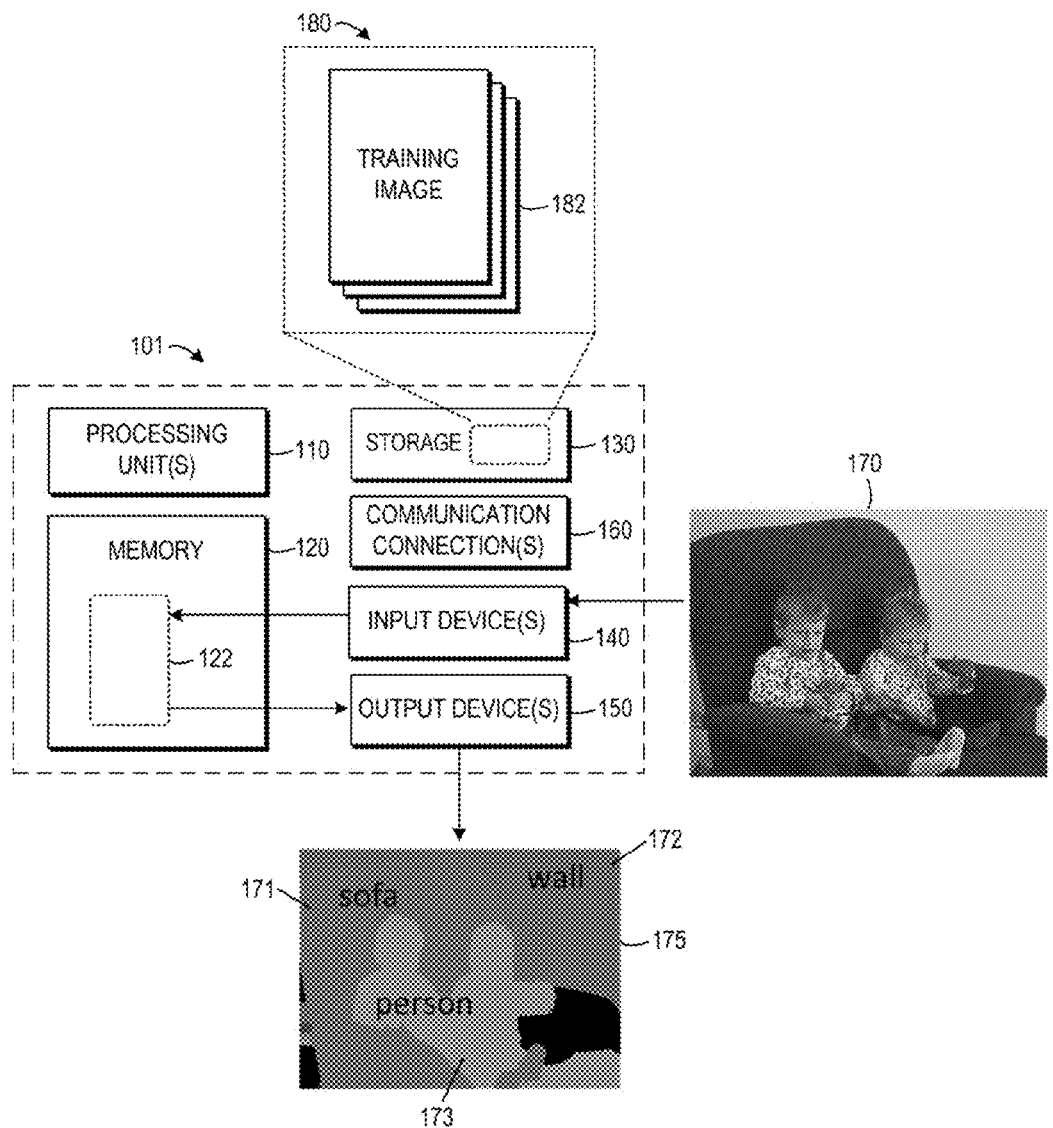
FIG. 1 illustrates a block diagram of an environment in which one or more implementations of the subject matter described herein can be implemented.

FIG. 1 illustrates the block diagram of example an environment in which one or more implementations of the subject matter described herein may be implemented. The environment is not intended to suggest any limitation as to scope of use or functionality of the subject matter described herein, as various implementations may be implemented in diverse general-purpose or special-purpose computing environments.

With reference to FIG. 1, the environment includes a device 101. In some implementations, the device 101 may be a server or a personal computer (PC) which is adapted for image processing. Although shown as a standalone machine, the device 101 can include a plurality of machines in other implementations. For example, in one implementation, the device 101 may be implemented in a cluster of networked machines.

As shown, the device 101 includes at least one processing unit (or processor) 110 and a memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination thereof. The memory 120 may contain at least a part of the modules or logic for image semantic segmentation, which will be discussed in further detail below.

The device 101 may have additional components or features. In the example shown in FIG. 1, the device 101 includes storage 130, one or more input devices 140, one or more output devices 150, and one or more communication connections 160. An interconnection mechanism (not shown) such as a bus, controller, or network interconnects the components of the device 101. Typically, operating system software (not shown) provides an operating environment for other software executing in the device 101, and coordinates activities of the components of the device 101.

The storage 130 may be removable or non-removable, and may include computer-readable storage media such as flash drives, magnetic disks or any other medium which can be used to store information and which can be accessed within the device 101. The input device(s) 140 may be one or more of various different input devices. For example, the input device(s) 140 may include a user device such as a mouse, keyboard, trackball, and the like. The input device(s) 140 may include a camera, a scanner and/or any other device that can be used to input images. As other examples, the input device(s) 140 may include a scanning device; a network adapter; or another device that provides input to the device 101. The output device(s) 150 may be a display, printer, speaker, network adapter, or another device that provides output from the device 101. The input device(s) 140 and output device(s) 150 may be incorporated in a single system or device, such as a touch screen or a virtual reality system.

The communication connection(s) 160 enables communication over a communication medium to another computing entity. Additionally, functionality of the components of the device 101 may be implemented in a single computing machine or in multiple computing machines that are able to communicate over communication connections. Thus, the device 101 may operate in a networked environment using logical connections to one or more other servers, network PCs, or another common network node. By way of example, and not limitation, communication media include wired or wireless networking techniques.

The device 101 includes an image processing system 122. The image processing system 122 includes modules or logic for image semantic segmentation. In some implementations, the image processing system 122 may be implemented by computer software program. In such implementations, at least a part of the image processing system 122 can be loaded into the memory 120 for execution by the processing unit(s) 110, as shown in FIG. 1. The other part (if any) of the image processing system 122 may be stored in the storage 130. Alternatively, in other implementations, the image processing system 122 may be implemented by hardware. For example, the device 101 may include an image processor (not shown) to act as the image processing system 122.

The image processing system 122 may determine the semantic category for each pixel in an input image, thereby achieving the semantic segmentation of the image. As shown in FIG. 1, an image 170 may be input into the device 101, for example, via the input device(s) 140. The image processing system 122 processes the image 170 and outputs the processing result 175 in which each pixel is assigned with a semantic label. The semantic label indicates the semantic category to which each pixel belongs. In the example shown in FIG. 1, a pixel may be assigned with a semantic category of "Sofa" 171, "Wall" 172 or "Person" 173. The result 175 may be output via the output device(s) 150, for example.

In general, the image semantic segmentation is achieved based on convolutional neural network (CNN). To this end, the image processing system 122 is trained using the training data 180 which can be stored in the storage 130, for example. The training data 180 includes a plurality of training images 182. The semantic category of each pixel in each training image 182 is determined in advance. For example, the semantic category of pixels in the training images 182 can be obtained by user labeling. The parameters and/or coefficients of the modules/logic in the image processing system 122 are then modified according to the training images 182 in order to train the CNN.

In accordance with implementations of the subject matter described herein, the image processing system 122 includes a plurality of convolutional layers for performing convolution filtering on the image. The image processing system 122 further includes a convolutional feature masking (CFM) layer that masks the convolutional feature maps generated by the convolutional layers to produce segment features. The segment features are fed into a segmentation module for image semantic segmentation. Example implementations of these and other optional modules will be further discussed in the following paragraphs.

Implementations of the subject matter can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the device 101, computer-readable storage media include memory 120, storage 130, and combinations thereof.

Implementations of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various implementations. Computer-executable instructions for program modules may be executed within a local or distributed computing environment. In a distributed computing environment, program modules may be located in both local and remote computer storage media.

Now some example implementations will be discussed in further detail. In accordance with implementations of the subject matter described herein, segment features are extracted from the feature maps which are obtained by convoluting the image. More particularly, the binary masks, which are generated from the candidate segments of the image, are used to mask the feature maps instead of the raw image. The resulting segment features will be used in the image semantic segmentation. Because the convolutional features are computed from the unmasked image, their quality is not impacted. In the meantime, the image semantic segmentation can be done efficiently since the convolutional feature maps only need to be computed once. Moreover, the artificial boundaries can be avoided.

Figure 2:
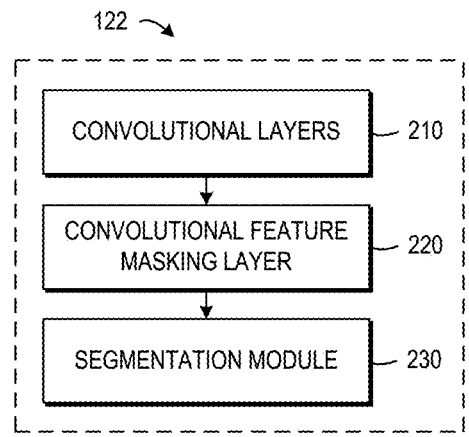
FIG. 2 illustrates a block diagram of an image processing system for image semantic segmentation in accordance with one implementation of the subject matter described herein.

FIG. 2 shows a block diagram of the image processing system 122 in accordance with example implementations of the subject matter described herein. As shown, the image processing system 122 includes a plurality of convolutional layers 210. As used herein, a "layer" refers to one or more modules or logic for performing specific operations. Each of the convolutional layers 210 includes a plurality of convolution filters. The convolutional layers 210 sequentially convolute the image. More particularly, the convolution filters in the first convolutional layer apply convolution filtering on the input image to be segmented. The results are referred to "convolutional feature maps" or "feature maps." The feature maps record the strength and spatial locations of the responses of the filters on the respective channels. The number of channels is defined by the number of the convolution filters in the convolutional layer. The feature map of each channel includes activations that record the semantic information for the respective regions in the image. More particularly, the semantic information is indicated by the strength of activations and each activation in the convolutional feature maps is contributed by a receptive field in the image domain.

The feature maps produced by the first convolutional layer is fed to the second convolutional layer, and the feature maps produced by the second convolutional layer is fed to the third convolutional layer, and so on. The feature maps produced by the last convolutional layer of the convolutional layers 210 are provided to a convolutional feature masking (CFM) layer 220 included in the image processing system 122, as shown in FIG. 2. It is to be understood that feature maps need to be computed only once, which would be beneficial to the efficiency of the image segmentation.

The CFM layer 220 is configured to mask the feature maps. That is, the masking is performed on the convolutional features rather than the raw image. To this end, binary masks are obtained from the segment proposals in the image. As used herein, a segment proposal refers to a candidate segment to be classified for semantic segmentation. Given the input image, a set of candidate segments may be obtained in a variety of ways. For example, in one implementation, the candidate segments may be generated by grouping super-pixels. As known, super-pixels capture redundancy of the image and reduce the complexity of subsequent processing task. The super-pixels can be grouped using graph-based approaches or gradient descent approaches. For example, the candidate segments can be obtained using selective search, multi-scale combinational grouping (MCG), and/or other algorithms.

Figure 3:
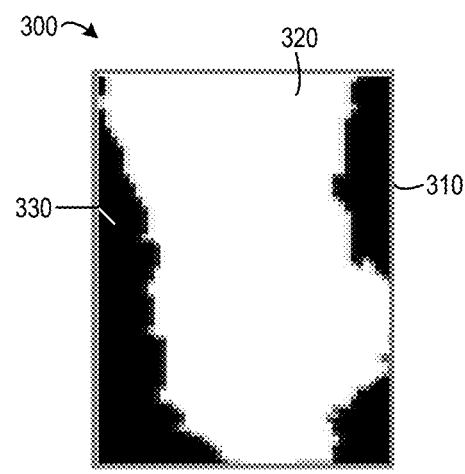
FIG. 3 illustrates a schematic diagram of a binary mask representing a candidate segment in the image in accordance with one implementation of the subject matter described herein.

Each candidate segment may be presented by a binary mask. The binary mask may the foreground mask and enclosing bounding box. FIG. 3 shows an example of a binary mask 300 corresponding to a candidate segment in the image. The binary mask 300 is defined by the bounding box 310 of the candidate segment. Within the mask 300, the values of pixels located inside the candidate segment 320 are set to one (shown in white), while the values of pixels in the other part are set to zero (shown in black).

In accordance with implementations of the subject matter described herein, instead of directly masking the raw image, the CFM layer 220 uses the binary masks representing the candidate segments to mask the convolutional feature maps produced by the last convolutional layer 210. It is supposed that the convolutional layers 210 generate the feature maps of N channels, where N is a natural number. The CFM layer masks the feature map of each channel with each binary mask. The resulting N masked convolutional features are referred to as "segment features."

It would be appreciated that the feature maps and the binary masks may have different resolutions. For example, since the candidate segments are obtained directly from the raw image, the resolution of the binary masks is usually higher than the resolution of the feature maps. Therefore, in some implementations, the CFM layer 220 first generates low-resolution binary masks based on the binary masks and the feature maps. The low-resolution binary masks are then applied onto the feature maps to generate the segment features.

In one implementation, the low-resolution binary masks may be generated by projections between the domain of the feature maps and the domain of the initial image. As known, each of the activations in the feature maps is contributed by multiple pixels in a respective region in the image. The activations in the feature maps may be projected to the image domain as centers of the respective regions. For each binary mask, each pixel may be associated with a center. For example, in one implementation, each pixel may be associated with the nearest center. Then the pixels in the binary mask may be projected back to the domain of the feature maps based on the associated centers and the position of the activations. That is, each pixel in the binary mask is assigned to one of the activations on the feature maps. In this way, each position on a feature map collects multiple pixels projected from the binary mask.

In one implementation, for each position on the feature maps, the binary values assigned to the activation at the position are averaged. The averaged value is then compared with a predetermined threshold. If the averaged value is below the threshold, the value at this position in the low-resolution mask is set to zero. Otherwise, if the averaged value exceeds the predetermined threshold, the mask value at this position is set to one. In this way, the low-resolution binary mask is generated.

It is to be understood that the above implementation is described merely for the purpose of illustration, without suggesting any limitation as to the scope of the subject matter described herein. For example, in those implementations where each position on a feature map collects multiple pixels from a binary mask, the thresholding may be done based on the maximum of the pixel values rather than the average value. As another example, in an alternative implementation, the low-resolution binary masks may be generated by directly scaling down the binary masks according to the resolution of the feature maps. Other modifications or variations are possible as well.

The CFM layer 220 applies each low-resolution binary mask onto the feature maps to mask the convolutional feature maps. For example, each low-resolution binary mask may be multiplied with the feature map of each channel. In this way, if the binary value in the low-resolution binary mask is one, the strength of activation at the corresponding position is maintained. Otherwise, if the binary value in the low-resolution binary masks is zero, the strength of activation at the corresponding position is set to zero.

Figure 4:
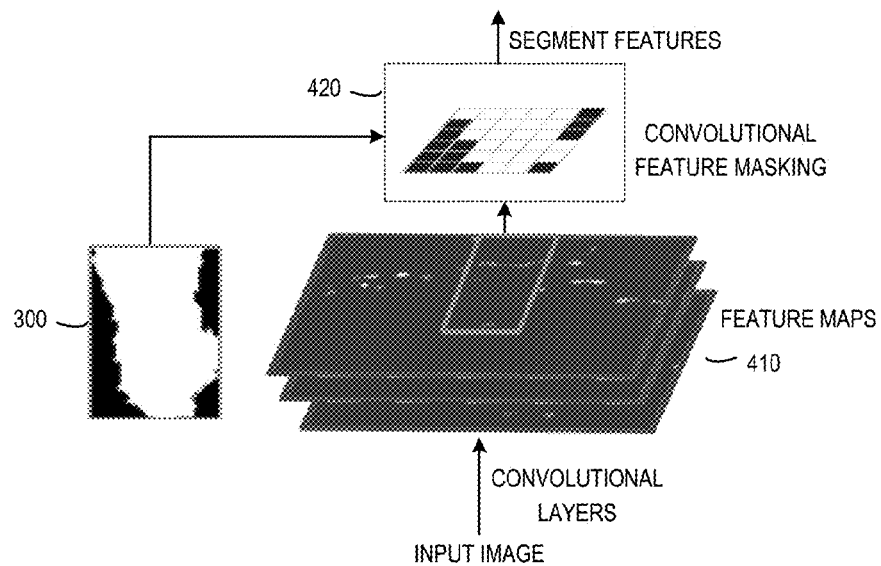
FIG. 4 illustrates a schematic diagram of masking the convolutional feature maps in accordance with one implementation of the subject matter described herein.

FIG. 4 shows a schematic diagram of the convolutional feature masking by the CFM layer 220 in accordance with implementations of the subject matter described herein. As shown, the feature maps 410 of multiple channels are obtained by convoluting the input image. A binary mask 300 represents a candidate segment in the raw image. The feature maps 410 of the respective channels are each masked by the binary mask 300 to generate the masked feature maps, namely, the segment features 420.

The CFM layer 220 provides the segment features to a segmentation module 230. The segmentation module 230 is configured to determine a semantic category for each pixel in the image at least in part based on the segment features. In some implementations, the segmentation module 230 includes a fully connected (FC) layer. As known, in the FC layer, a neuron connects to all the inputs and the responses of all the neurons in the layer form the output. In image segmentation, the FC layer may assign scores to each pixel in the image. A score indicates the probability that the pixel belongs to a respective semantic category. For example, in the example shown in FIG. 1, each pixel may be assigned with three scores that indicate the probabilities that the pixel belongs to "Sofa," "Person" and "Wall," respectively. The output of the FC layer may be fed to a classifier in the segmentation module 230 to determine the semantic category to which each pixel in the image belongs. The functionalities and principles of operations of the FC layer and the classifier are well known and therefore will be detailed here in order to avoid obscure the subject matter described herein.

It is to be understood that the image processing system 122 can be used in both training and the image segmentation. In training, the parameters and/or coefficients of the convolutional layers 210, the CFM layer 220 and/or the segmentation 230 can be adapted based on the training data. In addition, or alternatively, the underlying probabilistic distributions of the samples can be modified. In the testing phase, these modules work together to achieve the semantic segmentation of an input image. The joint object and stuff segmentation will be discussed in further detail below.

Figure 5:
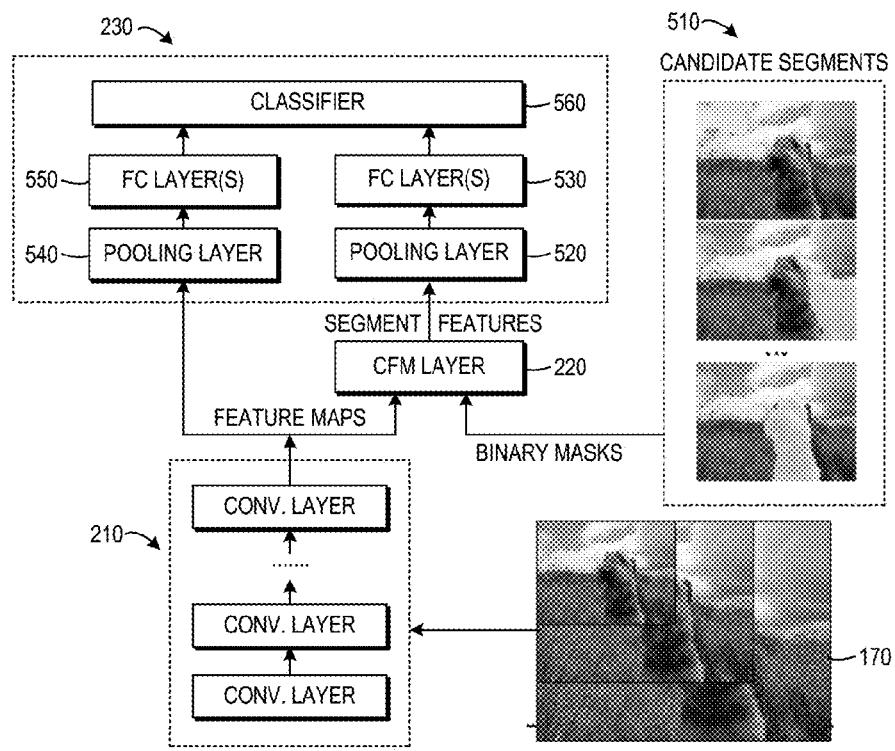
FIG. 5 illustrates a block diagram of an implementation of the image processing system in accordance with the subject matter described herein.

It has been found that sometimes the segment features alone may be not enough to achieve the semantic segmentation of images. To this end, in some implementations, the segment features generated by the CFM layer may be combined with the regional features from bounding boxes. The combination may be done in a variety of ways. FIG. 5 shows a block diagram of an implementation of the image processing system 122 where the segment features are combined with regional features.

In the implementations shown in FIG. 5, the input raw image 170 is fed into the convolutional layers 210. As described above, the convolutional layers 210 include a plurality of layers of convolution filters. The feature maps generated by the last convolutional layer 210 are fed into the CFM layer 220 for masking. A set of segment proposals or candidate segments 510 is obtained based on the input image 170. As discussed above, each of the candidate segments 510 may be represented by a binary task (for example, the binary mask 300 shown in FIG. 3). The binary masks are also input into the CFM layer 220. That is, in such implementation, the CFM layer 200 operates on the full-image convolutional feature maps.

In such implementations, the segmentation module 230 includes a first pooling layer 520. The first pooling layer 520 receives and pools the segment features generated by the CFM layers 200. As known, the spatial pooling combines the responses of features obtained at nearby locations into some statistic that summarizes the joint distribution of the feature over the region of interests. By means of pooling, the segment features of an arbitrary size (in terms of its bounding box) are adapted to a fixed-length output. Any suitable pooling technologies, either currently known or to be developed in the future, can be used. By way of example, in one implementation, the first pooling layer 520 may apply spatial pyramid pooling (SPP). The pooled segment features may be fed into a first FC layer(s) 530 included in the segmentation module 230. The first FC layer(s) 530 fully connects the pooled segment features.

On the other hand, the feature maps generated by the last convolutional layer 210 are also fed into a second pooling layer 540 included in the segmentation module 230. The second pooling layer 540 may pool the regional features of the image. Each regional feature is represented by a bounding box on the feature maps. The regional features can be generated in many different ways. For example, in some implementations, it is possible to generate the regional features as proposed by R. Girshick, J. Donahue, T. Darrell, and J. Malik. Rich Feature Hierarchies for Accurate Object Detection and Semantic Segmentation. arXiv preprint arXiv: 1311.2524, 2013, which is incorporated herein in its entirety by reference. Any other suitable technology for generating the regional features can be utilized as well.

In one implementation, the second pooling layer 540 may apply SPP on the regional features, for example. The pooled regional features are fed into a second FC layer(s) 550 included in the segmentation module 230. The second FC layer(s) 550 is coupled to the second pooling layer 540 and is configured to connect the pooled regional features. The connected segment features output from the first FC layer(s) 530 and the connected regional features output from the second FC layer(s) 550 are concatenated and fed into the classifier 560 for training and/or testing of the image semantic segmentation.

Figure 6:
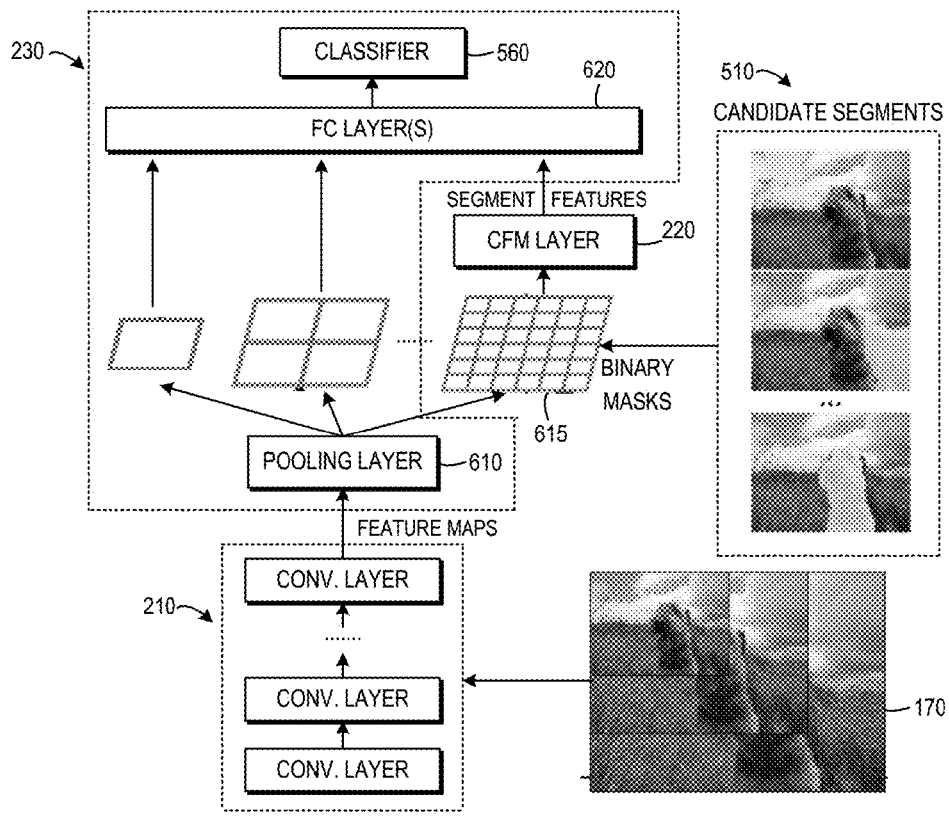
FIG. 6 illustrates a block diagram of another implementation of the image processing system in accordance with the subject matter described herein.

Instead of applying CFM on the full-image convolutional feature maps as shown in FIG. 5, in other implementations, the feature maps may be first pooled and the CFM may be only applied on some pooled feature maps of a certain level(s). FIG. 6 shows a block diagram of such an implementation of the image processing system 122. As shown in FIG. 6, in this implementation, the segmentation module 230 includes a third pooling layer 610 coupled to the convolutional layers 210 (more specifically, to the last convolutional layer). The feature maps generated by the convolutional layers 210 are directly pooled by the third pooling layer 630.

In the shown implementations, the third pooling layer 630 applies the SPP on the feature maps to obtain the pooled feature maps of multiple different levels. For example, in one implementation, the pooling may result in a four-level pyramid of {6×6; 3×3; 2×2; 1×1}. It would be appreciated that the feature maps of one or more tiny levels still have plenty spatial information. Therefore, the CFM layer may apply CFM on a tiny level(s) of the feature map. For example, in one implementation, the CFM may be applied on the feature map of the tiniest level. In the example shown in FIG. 6, the CFM layer may mask the 6×6 tiny feature map 615 with the binary masks representing the candidate segments 510. The resulting segment features are fed into a FC layer(s) 620 in the segmentation module 230. The FC layer(s) 620 is coupled to both the CFM layer 220 and the third pooling layer 610. The segment features from the CFM layer 220 and the pooled feature maps of other levels from the third pooling layer 610 are fully connected by the FC layer(s) 620. In this way, the segment features are concatenated with the other levels of feature maps before being fed into the classifier 560 for the training and/or testing. In this way, the computational cost and over-fitting risk can be reduced since there is only one pathway of the FC layers.

Figure 7:
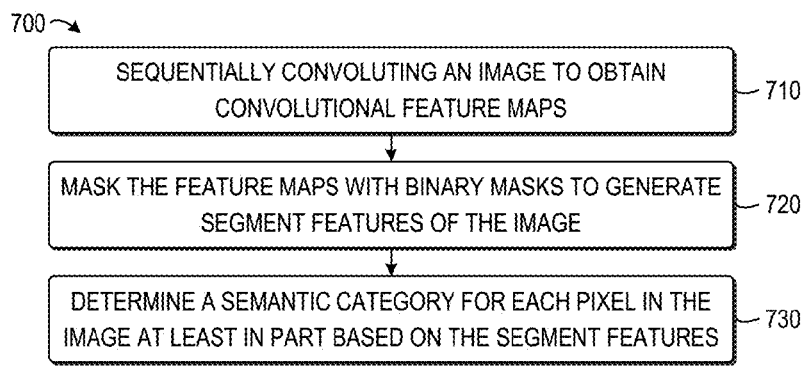
FIG. 7 illustrates a flowchart of a method for image semantic segmentation in accordance with one implementation of the subject matter described herein.

FIG. 7 shows a flowchart of a method for image semantic segmentation. In step 710, a sequence of convolution filtering is applied on an image to obtain feature maps, the feature maps including a plurality of activations. Each of the activations represents semantic information for a region on the image. Then in step 720, the feature maps are masked with binary masks to generate segment features of the image, where each of the binary masks represents a candidate segment of the image. In step 730, a semantic category for each pixel in the image is determined at least in part based on the segment features.

In some implementations, in step 720, the low-resolution binary masks may be generated based on the binary masks and the feature maps. The low-resolution binary masks are applied onto the feature maps to generate the segment features. To this end, each of the activations on the feature maps may be projected to a center of the respective region on the image. Each pixel in the binary masks is associated with the nearest center. Then the pixels in the binary masks may be assigned to one of the activations on the feature maps based on the associated center. Then, in some implementations, the values of pixels assigned to each of the activations are averaged and compared with a predetermined threshold to generate the low-resolution binary masks.

In some implementations, in step 720, the feature maps may be directly masked to generate the segment features. In such implementations, in step 730, the segment features may be pooled and the pooled segment features may be fully connected. In addition, the regional features on the feature maps may be pooled, where each regional feature is represented by a bounding box. The pooled regional features may be fully connected as well. Accordingly, the semantic category for each pixel in the image may be determined based on a concatenation of the connected segment features and the connected regional features. In some implementations, at least one of the segment features and the regional features are pooled by SPP.

In some implementations, in step 720, the generated feature maps may be first pooled SPP to obtain multiple levels of pooled feature maps. Then only the pooled feature map(s) of a tiny level(s) is masked with the binary masks to generate the segment features. In such implementations, in step 730, the segment features and the pooled feature maps of other levels among from the multiple levels are connected.

As discussed above, implementations of the subject matter described herein allow the joint object and stuff segmentation. That is, the objects and stuff can be both handled in the uniform architecture. Especially, the convolutional feature maps need only to be computed once and therefore there will be little extra cost. In training stage, the underlying probabilistic distributions of the samples can be modified. Instead of treating the samples equally, the training may bias toward the proposals that can cover the stuff as compact as possible. A "segment pursuit" procedure may be used to find the compact proposals.

In some implementations, the stuff may be treated as a combination of multiple segment proposals. Each segment proposal is expected to cover a stuff portion as much as possible, and stuff can be fully covered by several segment proposals. In the meantime, the combination of these segment proposals is expected to be compact. A candidate set of segment proposals (in a single image) may be defined for stuff segmentation. A "purity score" may be defined as the intersection-over-union (IoU) ratio between a segment proposal and the stuff portion that is within the bounding box of this segment. Among the segment proposals in a single image, those having high purity scores with stuff consist of the candidate set for potential combinations.

To generate one compact combination from this candidate set, a procedure similar to the matching pursuit may be adopted. Segments from the candidate set may be sequentially picked without replacement. At each step, the largest segment proposal is selected. The selected proposal then inhibits its highly overlapped proposals in the candidate set.

In one implementation, for example, the inhibition overlap threshold is set as IoU=0.2. The process is repeated till the remaining segments all have areas smaller than a threshold, which is the average of the segment areas in the initial candidate set (of that image). It can be proved that the segment pursuit is deterministic and can only give a small set of samples from each image.

All the segment proposals given in this way are considered as the positive samples of a category of stuff. The negative samples are the segment proposals whose purity scores are below a threshold. These samples can then be used for fine-tuning. During the fine-tuning stage, in each epoch each image generates a stochastic compact combination. All the segment proposals in this combination for all images consist of the samples of this epoch. These samples are randomly permuted and fed into the Stochastic Gradient Descent (SGD) solver, for example. Although now the samples appear mutually independent to the SGD solver, they are actually sampled jointly by the rule of segment pursuit. Their underlying probabilistic distributions will impact the SGD solver. This process is repeated for each epoch. For the SGD solver, the training process may be halted after a certain number (for example, 200 k) mini-batches. For Support Vector Machine (SVM) training, it is possible to use only the single combination given by the deterministic segment pursuit.

In this way, the joint object and stuff segmentation may be implemented in the same framework as for objects only. The only difference is that the stuff samples are provided in a way given by segment pursuit, rather than purely randomly. The testing stage is the same as in the object-only case. While the testing stage is unchanged, the classifiers learned are biased toward those compact proposals.

Experiments have shown that by use of masked convolutional features, implementations of the subject matter describe herein significantly improve the efficiency of image segmentation. Moreover, the image semantic segmentation is free of artificial boundaries, there improving the accuracy.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter described herein are listed below.

In one implementation, a system is proposed. The system includes: a plurality of convolutional layers configured to sequentially apply convolution filtering on an image to obtain feature maps, the feature maps including a plurality of activations, each of the activations representing semantic information for a region on the image; a convolutional feature masking (CFM) layer configured to mask the feature maps with binary masks to generate segment features of the image, each of the binary masks representing a candidate segment of the image; and an segmentation module configured to determine a semantic category for each pixel in the image at least in part based on the segment features.

In one implementation, the CFM layer is configured to generate low-resolution binary masks based on the binary masks and the feature maps; and apply the low-resolution binary masks onto the feature maps to generate the segment features.

In one implementation, the CFM layer is configured to project each of the activations on the feature maps to a center of the respective region on the image; associate each pixel in the binary masks with the nearest center; and assign each pixel in the binary masks to one of the activations on the feature maps based on the associated center.

In one implementation, the CFM layer is configured to compute the average value of pixels that are assigned to each of the activations. Then the low-resolution binary masks are generated by comparing the averaged values and a predetermined threshold.

In one implementation, the CFM layer is coupled to the convolutional layers and configured to mask the feature maps directly output from the convolutional layers. The segmentation module comprises a first pooling layer coupled to the CFM layer and configured to pool the segment features generated by the CFM layer; and a first fully connected (FC) layer coupled to the first pooling layer and configured to connect the pooled segment features;

In one implementation, the segmentation module further comprises a second pooling layer coupled to the convolutional layers and configured to pool regional features on the feature maps, each of the regional features being represented by a bounding box; a second FC layer coupled to the second pooling layer and configured to connect the pooled regional features; and a classifier configured to determine the semantic category for each pixel in the image based on a concatenation of the connected segment features and the connected regional features.

In one implementation, at least one of the first and second pooling layers includes a spatial pyramid pooling (SPP) layer.

In one implementation, the segmentation module comprises: a third pooling layer coupled to the convolutional layers and configured to pool the feature maps output from the convolutional layers by spatial pyramid pooling (SPP) to obtain multiple levels of pooled feature maps. The CFM layer is configured to mask the pooled feature map of a tiny level among from the multiple levels to generate the segment features.

In one implementation, the segmentation module further comprises a fully connected (FC) layer coupled to the CFM layer and the third pooling layer, the FC layer being configured to connect the segment features and the pooled feature maps of other levels among from the multiple levels.

In one implementation, a method is proposed. The method comprises applying a sequence of convolution filtering on an image to obtain feature maps, the feature maps including a plurality of activations, each of the activations representing semantic information for a region on the image; masking the feature maps with binary masks to generate segment features of the image, each of the binary masks representing a candidate segment of the image; and determining a semantic category for each pixel in the image at least in part based on the segment features.

In one implementation, masking the feature maps comprises: generating low-resolution binary masks based on the binary masks and the feature maps; and applying the low-resolution binary masks onto the feature maps to generate the segment features.

In one implementation, generating the low-resolution binary masks comprises: projecting each of the activations on the feature maps to a center of the respective region on the image; associating each pixel in the binary masks with the nearest center; and assigning each pixel in the binary masks to one of the activations on the feature maps based on the associated center.

In one implementation, generating the low-resolution binary masks further comprises: averaging values of pixels assigned to each of the activations; and generating the low-resolution binary masks by comparing the averaged values and a predetermined threshold.

In one implementation, masking the feature maps comprises directly masking the feature maps to generate the segment features. Determining the semantic category for each pixel in the image comprises: pooling the segment features; and connecting the pooled segment features.

In one implementation, determining the semantic category for each pixel in the image further comprises: pooling regional features on the feature maps, each of the regional features being represented by a bounding box; connecting the pooled regional features; and determining the semantic category for each pixel in the image based on a concatenation of the connected segment features and the connected regional features.

In one implementation, at least one of the segment features and the regional features are pooled by spatial pyramid pooling (SPP).

In one implementation, masking the feature maps comprises: pooling the generated feature maps by spatial pyramid pooling (SPP) to obtain multiple levels of pooled feature maps; and masking the pooled feature map of a tiny level among from the multiple levels to generate the segment features.

In one implementation, determining the semantic category for each pixel in the image comprises: connecting the segment features and the pooled feature maps of other levels among from the multiple levels.

In one implementation, computer program product being tangibly stored on a non-transient machine-readable medium is provided. The computer program product comprises machine-executable instructions. The instructions, when executed on a device, cause the device to: apply a sequence of convolution filtering on an image to obtain feature maps, the feature maps including a plurality of activations, each of the activations representing semantic information for a region on the image; mask the feature maps with binary masks to generate segment features of the image, each of the binary masks representing a candidate segment of the image; and determine a semantic category for each pixel in the image at least in part based on the segment features.

In one implementation, the instructions, when executed on the device, cause the device to: generate low-resolution binary masks based on the binary masks and the feature maps; and apply the low-resolution binary masks onto the feature maps to generate the segment features.

In one implementation, the instructions, when executed on the device, cause the device to: project each of the activations on the feature maps to a center of the respective region on the image; associate each pixel in the binary masks with the nearest center; and assign each pixel in the binary masks to one of the activations on the feature maps based on the associated center.

In one implementation, the instructions, when executed on the device, cause the device to: average values of pixels assigned to each of the activations; and generate the low-resolution binary masks by comparing the averaged values and a predetermined threshold.

In one implementation, the instructions, when executed on the device, cause the device to directly mask the feature maps to generate the segment features; and pool the segment features; and connecting the pooled segment features.

In one implementation, the instructions, when executed on the device, cause the device to: pool regional features on the feature maps, each of the regional features being represented by a bounding box; connect the pooled regional features; and determine the semantic category for each pixel in the image based on a concatenation of the connected segment features and the connected regional features.

In one implementation, at least one of the segment features and the regional features are pooled by spatial pyramid pooling (SPP).

In one implementation, the instructions, when executed on the device, cause the device to: pool the generated feature maps by spatial pyramid pooling (SPP) to obtain multiple levels of pooled feature maps; and mask the pooled feature map of a tiny level among from the multiple levels to generate the segment features.

In one implementation, the instructions, when executed on the device, cause the device to connect the segment features and the pooled feature maps of other levels among from the multiple levels.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    applying a sequence of convolution filtering on an image to obtain feature maps, the feature maps including a plurality of activations, each of the activations representing semantic information for a region on the image;
    masking the feature maps with binary masks to generate segment features of the image, each of the binary masks representing a candidate segment of the image; and
    determining a semantic category for each pixel in the image at least in part based on the segment features.

2. The method of claim 1, wherein masking the feature maps comprises:
    generating low-resolution binary masks based on the binary masks and the feature maps; and
    applying the low-resolution binary masks onto the feature maps to generate the segment features.

3. The method of claim 2, wherein generating the low-resolution binary masks comprises:
    projecting each of the activations on the feature maps to a center of the respective region on the image;
    associating each pixel in the binary masks with the nearest center; and
    assigning each pixel in the binary masks to one of the activations on the feature maps based on the associated center.

4. The method of claim 3, wherein generating the low-resolution binary masks further comprises:
    averaging values of pixels assigned to each of the activations; and
    generating the low-resolution binary masks by comparing the averaged values and a predetermined threshold.

5. The method of claim 1,
    wherein masking the feature maps comprises:
        directly masking the feature maps to generate the segment features, and
    wherein determining the semantic category for each pixel in the image comprises:
        pooling the segment features; and
        connecting the pooled segment features.

6. The method of claim 5, wherein determining the semantic category for each pixel in the image further comprises:
    pooling regional features on the feature maps, each of the regional features being represented by a bounding box;
    connecting the pooled regional features; and
    determining the semantic category for each pixel in the image based on a concatenation of the connected segment features and the connected regional features.

7. The method of claim 5, wherein at least one of the segment features and the regional features are pooled by spatial pyramid pooling (SPP).

8. The method of claim 1, wherein masking the feature maps comprises:
    pooling the generated feature maps by spatial pyramid pooling (SPP) to obtain multiple levels of a pooled feature map; and
    masking the pooled feature map of a tiny level from the multiple levels to generate the segment features.

9. The method of claim 8, wherein determining the semantic category for each pixel in the image comprises:

connecting the segment features and the pooled feature map of other levels among from the multiple levels.

10. A computer program product being tangibly stored on a non-transient machine-readable medium and comprising machine-executable instructions, the instructions, when executed on a device, causing the device to:
apply a sequence of convolution filtering on an image to obtain feature maps, the feature maps including a plurality of activations, each of the activations representing semantic information for a region on the image;
mask the feature maps with binary masks to generate segment features of the image, each of the binary masks representing a candidate segment of the image; and
determine a semantic category for each pixel in the image at least in part based on the segment features.

11. The computer program product of claim 10, wherein the instructions, when executed on the device, cause the device to:
generate low-resolution binary masks based on the binary masks and the feature maps; and
apply the low-resolution binary masks onto the feature maps to generate the segment features.

12. The computer program product of claim 10, wherein the instructions, when executed on the device, cause the device to:
project each of the activations on the feature maps to a center of the respective region on the image;
associate each pixel in the binary masks with the nearest center; and
assign each pixel in the binary masks to one of the activations on the feature maps based on the associated center.

13. The computer program product of claim 10, wherein the instructions, when executed on the device, cause the device to:
average values of pixels assigned to each of the activations; and
generate the low-resolution binary masks by comparing the averaged values and a predetermined threshold.

14. A computing device, comprising:
at least one memory and at least one processor, wherein the at least one memory and the at least one memory are respectively configured to store and execute instructions for causing the computing device to perform operations, the operations including:
applying a sequence of convolution filtering on an image to obtain feature maps, the feature maps including a plurality of activations, each of the activations representing semantic information for a region on the image;
masking the feature maps with binary masks to generate segment features of the image, each of the binary masks representing a candidate segment of the image; and
determining a semantic category for each pixel in the image at least in part based on the segment features.

15. The computing device of claim 14, wherein masking the feature maps comprises:
generating low-resolution binary masks based on the binary masks and the feature maps; and
applying the low-resolution binary masks onto the feature maps to generate the segment features.

16. The computing device of claim 15, wherein generating the low-resolution binary masks comprises:
projecting each of the activations on the feature maps to a center of the respective region on the image;
associating each pixel in the binary masks with the nearest center; and
assigning each pixel in the binary masks to one of the activations on the feature maps based on the associated center.

17. The computing device of claim 16, wherein generating the low-resolution binary masks further comprises:
averaging values of pixels assigned to each of the activations; and
generating the low-resolution binary masks by comparing the averaged values and a predetermined threshold.

18. The computing device of claim 16, wherein determining the semantic category for each pixel in the image further comprises:
pooling regional features on the feature maps, each of the regional features being represented by a bounding box;
connecting the pooled regional features; and
determining the semantic category for each pixel in the image based on a concatenation of the connected segment features and the connected regional features.

19. The computing device of claim 16, wherein at least one of the segment features and the regional features are pooled by spatial pyramid pooling (SPP).

20. The computing device of claim 14,
wherein masking the feature maps comprises:
directly masking the feature maps to generate the segment features, and
wherein determining the semantic category for each pixel in the image comprises:
pooling the segment features; and
connecting the pooled segment features.

* * * * *